(12) United States Patent
Trunk

(10) Patent No.: US 11,391,632 B2
(45) Date of Patent: Jul. 19, 2022

(54) TEMPERATURE SENSOR CIRCUIT

(71) Applicant: Robert Bosch GmbH, Stuttgart (DE)

(72) Inventor: Martin Trunk, Neuenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 16/639,611

(22) PCT Filed: Aug. 9, 2018

(86) PCT No.: PCT/EP2018/071582
§ 371 (c)(1),
(2) Date: Feb. 17, 2020

(87) PCT Pub. No.: WO2019/034508
PCT Pub. Date: Feb. 21, 2019

(65) Prior Publication Data
US 2020/0173866 A1  Jun. 4, 2020

(30) Foreign Application Priority Data

Aug. 15, 2017 (DE) ...................... 10 2017 214 214.6

(51) Int. Cl.
*G01K 7/00* (2006.01)
*G01K 7/24* (2006.01)
(52) U.S. Cl.
CPC ...................... *G01K 7/24* (2013.01)
(58) Field of Classification Search
CPC combination set(s) only.
See application file for complete search history.

(56) References Cited

U.S. PATENT DOCUMENTS

| 4,215,336 A | 7/1980 | Smith | |
|---|---|---|---|
| 5,847,546 A * | 12/1998 | Sengupta | G01R 31/3648 320/144 |
| 8,556,505 B2 * | 10/2013 | Akins | G01K 15/00 374/183 |
| 2007/0171055 A1 * | 7/2007 | Laakso | G01K 7/24 340/545.2 |
| 2009/0110028 A1 * | 4/2009 | Goh | G01K 7/16 374/185 |

(Continued)

FOREIGN PATENT DOCUMENTS

| CN | 1548934 A | 11/2004 |
|---|---|---|
| CN | 102226878 A | 10/2011 |

(Continued)

OTHER PUBLICATIONS

International Search Report for Application No. PCT/EP2018/071582 dated Nov. 7, 2018 (English Translation, 2 pages).

*Primary Examiner* — Lisa M Caputo
*Assistant Examiner* — Nasir U. Ahmed
(74) *Attorney, Agent, or Firm* — Michael Best & Friedrich LLP

(57) ABSTRACT

A temperature sensor circuit (1) for measuring a temperature, comprising a measuring resistor (2) and a controllable voltage source (3) or current source (3) which is connected to the measuring resistor (2) and by means of which an input voltage can be applied to the measuring resistor (2). The input voltage can be adjusted continuously by the controllable voltage source (3).

8 Claims, 2 Drawing Sheets

(56) References Cited

U.S. PATENT DOCUMENTS

| | | | | |
|---|---|---|---|---|
| 2011/0090938 A1* | 4/2011 | Akins | ............... | G01K 7/24 |
| | | | | 374/185 |
| 2011/0291869 A1* | 12/2011 | Utsuno | ............... | G01K 7/24 |
| | | | | 341/132 |
| 2011/0310928 A1* | 12/2011 | Kawamura | ............... | G01K 15/007 |
| | | | | 374/185 |
| 2015/0091591 A1* | 4/2015 | Charles | ............... | G01K 7/22 |
| | | | | 324/691 |
| 2015/0219503 A1* | 8/2015 | Yoshida | ............... | G01K 7/24 |
| | | | | 374/170 |
| 2016/0161343 A1 | 6/2016 | Smith et al. | | |

FOREIGN PATENT DOCUMENTS

| | | |
|---|---|---|
| CN | 102565534 A | 7/2012 |
| CN | 105784176 A | 7/2016 |
| GB | 197072 | 5/1923 |
| GB | 1164792 A | 9/1969 |

\* cited by examiner

TEMPERATURE SENSOR CIRCUIT

BACKGROUND OF THE INVENTION

The temperature of an electrical machine is currently usually measured with the aid of an NTC thermistor [NTC=negative temperature coefficient]. In this case, the NTC thermistor usually forms, with a fixed resistor (often also called a voltage divider resistor in a sensor arrangement), a voltage divider. The divided voltage value across the NTC thermistor is converted into a digital signal in an analog/digital converter and is used to calculate a temperature. If necessary, the resistance value of the fixed resistor or of the voltage divider resistor is changed over in order to widen the measurement range or to obtain temperature values which are plausible and can be diagnosed over an increased temperature measurement range. Furthermore, additional protective circuits are needed to protect the NTC thermistor (or the entire temperature sensor arrangement) from overloading. In particular, short-circuit protection is necessary.

The intention here is to describe an improved temperature sensor circuit which makes it possible, in particular, to easily evaluate the measurement results from the temperature sensor and enables good protection of the temperature sensor and of the temperature sensor circuit from overloading during operation and in the event of a fault. A high degree of temperature measurement accuracy is achieved at the same time.

SUMMARY OF THE INVENTION

The intention here is to describe a temperature sensor circuit for measuring a temperature, comprising a measurement resistor and a controllable voltage source or current source which is connected to the measurement resistor and can be used to apply an input voltage to the measurement resistor, wherein the input voltage can be adjusted continuously using the controllable voltage source or current source.

Two different variants which can be used to control the input voltage are specified here. This can either take place using a controllable voltage source which is used to directly control the input voltage. Alternatively, this can take place using a controllable current source which can be used to indirectly adjust the input voltage by deliberately adapting the current provided in such a manner that a desired input voltage results. Both variants (with a voltage source or with a current source) are disclosed independently of one another here. If the text below refers to a voltage source, an accordingly configured current source can alternatively also always be used.

The temperature sensor circuit also preferably has a voltage divider resistor, with which the measurement resistor is connected in series.

The temperature sensor circuit is used, in particular, to determine or measure a temperature.

The measurement resistor of the temperature sensor circuit is particularly preferably not connected in a low-impedance manner both in the direction of the voltage source and in the direction of a reference mass. A high-impedance (not low-impedance) connection of the measurement resistor in the direction of the voltage source is preferably achieved by means of an internal resistor in the voltage source (which possibly simultaneously acts as a damping resistor). A high-impedance (not low-impedance) connection of the measurement resistor in the direction of a reference mass is preferably achieved by means of the voltage divider resistor.

The high-impedance connections of the measurement resistor by means of the internal resistor of the voltage source and the voltage divider resistor limit the short-circuit current in the event of a short circuit of the measurement resistor or of the temperature sensor circuit. The temperature sensor is protected from destruction by these resistors.

As a result of the variable supply voltage, the temperature sensor circuit can always be operated at its optimum operating point or at a specified rated current. This increases the measurement accuracy.

It is not only possible to change over a resistance value to another measurement range, but rather the measurement range and the measurement accuracy of the temperature sensor circuit can be adjusted continuously with the aid of the controllable voltage source. It is possible to avoid tolerance-related sudden changes which arise when changing over between different measurement ranges of a temperature sensor circuit which can be adjusted in a stepped manner.

It is possible to variably track or change the voltage supply or the controllable voltage source. Sudden changes caused by changing over between different measurement ranges can be avoided.

The controllable voltage source is suitable (as described), in particular, for providing a variable voltage supply. The controllable voltage source can be used, in particular, to deliberately vary the current flowing through the sensor in such a manner that the self-heating of the sensor is reduced.

The measurement resistor of the temperature sensor circuit is preferably an NTC thermistor [NTC=negative temperature coefficient]. The term "input voltage" denotes the voltage which is applied to the temperature sensor using the controllable voltage source. In principle, the measurement resistor may also be a PTC thermistor [PTC=positive temperature coefficient].

It is particularly preferred if a first connection for reducing a first measurement voltage is at a first end of the measurement resistor. The first end of the measurement resistor is preferably that end to which the controllable voltage source is also connected.

It is also preferred if a second connection for reducing a second measurement voltage is at a second end of the measurement resistor. The second end of the measurement resistor is preferably that end to which the reference mass is also connected. The temperature sensor circuit having a first connection for reducing a first measurement voltage and a second connection for reducing a second measurement voltage has the advantage that a differential measurement for determining a differential voltage occurring across the measurement resistor is possible in a particularly precise manner.

It is particularly preferred if an analog/digital converter is connected to at least one connection of the temperature sensor circuit for reducing a measurement voltage and can be used to convert a measurement voltage into a digital voltage signal. An analog/digital converter can be used to convert a voltage signal into a digital signal. A digital signal can be digitally processed further.

A current sensor is also preferably connected in series with the measurement resistor in order to measure an electrical current flowing through the measurement resistor. The knowledge of the electrical current flowing through the measurement resistor makes it possible to determine, together with measurement voltages which arise (first measurement voltage and/or second measurement voltage), the electrical energy which is converted by the measurement resistor and produces the heat.

A current sensor can preferably be a voltage divider resistor or a fixed resistor which can be used to measure a flowing current.

The temperature sensor circuit also has an evaluation circuit which is configured to regulate the controllable voltage source on the basis of an input variable from the temperature sensor circuit in order to adapt the input voltage to the input variable.

The input variable is, in particular, the temperature measured by the temperature sensor circuit or the temperature determined using the temperature sensor circuit. However, the input variable may also be any other desired input variable which is determined using the temperature sensor circuit or in the temperature sensor circuit and has an effect on the heating of the temperature sensor circuit or of the measurement resistor. The input variable may be, in particular, an electrical current measured using a current sensor or a value determined on the basis of this electrical current. Such a value determined on the basis of the electrical current is, for example, an electrical power or an electrical energy which is caused by the electrical current and contributes to heating the measurement resistor or the temperature sensor circuit.

The controllable voltage source particularly preferably has a PWM module which is connected to a damping resistor and a capacitor in order to generate the input voltage from a constant supply voltage, wherein the input voltage is regulated by specifying a pulse width for the PWM module.

The PWM module [PWM=pulse width modulation] makes it possible to provide voltage at at least two different voltage levels. An increased voltage level and a basic voltage level usually exist. In preferred embodiment variants, the basic voltage level is zero. However, embodiment variants are also possible in which the basic voltage level differs from zero. On account of the increased voltage level, an increased measurement current through the temperature sensor circuit (in particular through the measurement resistor) is also usually established and is increased, in particular, in comparison with the current which flows when the basic voltage level is applied.

With a higher voltage level and an increased measurement current through the measurement resistor, an increased degree of accuracy of the temperature measurement is possible, in particular, because even small temperature differences in the case of an increased measurement current result in increased voltage differences across the measurement resistor.

It is particularly preferred if the increased current needed for a high degree of measurement accuracy is adjusted only in a pulsed manner by means of the PWM module. Increased heating of the measurement resistor then also occurs only briefly (during the phases of the increased measurement current). The heating of the measurement resistor and of the temperature sensor circuit can thus be reduced overall with a high degree of measurement accuracy. As a result of the variable voltage supply, the sensor can always be operated in a plausible range and precise temperature determination is possible at any time.

The temperature sensor circuit described here is therefore distinguished by the fact that a temperature sensor having the property of a temperature-dependent resistor is operated from a variable voltage supply. Furthermore, this temperature sensor circuit is distinguished by the fact that the current flowing through the temperature sensor is measured. Furthermore, this temperature sensor circuit is distinguished by the fact that the voltage dropped across the temperature sensor is measured (for example by forming the difference between the voltages measured at two connections).

It should be pointed out that the order of the different elements of the temperature sensor circuit (measurement resistor, voltage divider resistor, damping resistor and current sensor) is arbitrary. The important factor is only that these components are connected in series with one another between a reference mass and the controllable voltage source.

The temperature sensor circuit is also distinguished, in particular, by the fact that the current flowing through the temperature sensor circuit is adjusted by pulsing the variable voltage supply in such a manner that the self-heating of the sensor is reduced and the measurement accuracy is increased.

In particular, the current flowing through the temperature sensor circuit is adjusted in such a manner that the temperature sensor circuit is operated at the optimum or specified operating point.

The temperature sensor circuit can be calibrated and measurement errors can be reduced by varying the voltage supply. For example, a quantization error of an analog/digital converter can be partially removed by setting different voltages at the same temperature.

The variable voltage supply (which is produced by the controllable voltage source) can be implemented by means of a PWM output of a microcontroller with a downstream low-pass filter. The low-pass filter results in the pulsed current or the pulsed voltage, which forms the output of the PWM module, being smoothed or converted into a constant voltage and current level. The ratio of voltage-free intervals of time to intervals of time in which a voltage is applied to the PWM output is usually proportional to the ratio of the voltage input and voltage output of the low-pass filter. The low-pass filter is preferably formed by a damping resistor and a capacitor. The voltage level at the output of the damping circuit therefore results from the duty cycle of the PWM signal. Other control methods such as fixed on-times and variable off-times are also possible in order to produce a variable voltage using the controllable voltage source.

In comparison with a temperature sensor circuit having a voltage divider which can be changed over, the temperature sensor circuit described here has the advantage that the evaluation circuit can be changed smoothly and therefore continuously in response to the optimum evaluation range of the sensor.

The sensor is not operated using a constant voltage source and a voltage divider (which can possibly be changed over) as previously, but rather is supplied by a variable voltage source.

The intention here is also to describe a method for carrying out a temperature measurement using a temperature sensor circuit described, having the following steps of:

a) providing a measurement current which flows through the measurement resistor for the temperature measurement, b) providing an increased measurement current which flows through the measurement resistor for the temperature measurement in at least one limited interval of time, c) providing a measurement signal of the temperature measurement, wherein an increased degree of measurement accuracy is assumed for the temperature measurement during the limited interval of time from step b).

Step a) preferably takes place continuously. The measurement current provided according to step a) is provided, in particular, by virtue of the fact that the controllable voltage source produces a particular basic voltage. Step b) is preferably carried out in a pulsed manner or repeatedly during step a) using the controllable voltage source. The increased measurement current is preferably produced by an increased voltage which is provided by the controllable voltage source. If the controllable voltage source has a PWM module, the voltage and the measurement current can be increased, for example, by lengthening the voltage pulses of PWM operation. Alternatively, the repetition frequency of voltage pulses can also be increased in order to provide an increased measurement current in step b).

The assumption of the increased degree of measurement accuracy (step c)) of the temperature measurement during the at least one limited interval of time (step b)) is made, in particular, by preferably taking into account measured temperature values during the limited interval of time. Temperature values measured during the limited interval of time are preferably directly provided. Temperature values which are measured outside the limited interval of time are preferably taken into account to a lesser extent. The temperature measurements during the limited interval of time are particularly preferably used to validate and correct temperature measurements outside the limited interval of time. Only temperature values calibrated with a filter are preferably provided outside the limited interval of time, wherein such a filter is created with the aid of temperature values determined during the limited interval of time. This filter can be, for example, in the form of a low-pass filter which is always calibrated, in the limited interval of time, to a starting value, starting from which temperature changes in periods outside the limited interval of time are taken into account only in a filtered (attenuated) manner.

Step c) is carried out, in particular, in a part of the temperature sensor circuit. A temperature value is preferably output continuously (during the limited interval of time and outside the limited interval of time) at an output of the temperature sensor circuit.

The method is particularly preferred if it additionally comprises the following steps of:

d) detecting sensor heating as a result of the measurement current, e) regulating at least one of the following parameters on the basis of the heating detected in step d):

current intensity of the increased measurement current in step b), current intensity of the measurement current in step a), length of the limited interval of time in step b), and repetition rate of step b).

The detection of the sensor heating in step d) is preferably carried out indirectly. The current flowing through the measurement resistor is determined using a current sensor of the temperature sensor circuit. An amount of thermal energy which is introduced into the sensor can be inferred from the flowing current. If appropriate, the amount of thermal energy introduced into the sensor also depends on voltages which arise at the connections of the temperature sensor circuit when a measurement current flows through the measurement resistor. If appropriate, the sensor heating which occurs can initially be calculated from the measured current and the voltages. This calculated sensor heating which occurs is then used for the regulation in step e). If appropriate, it is also possible for the measurement current and possibly the voltages occurring at the connections to be used directly for the regulation in step e). The detection of the sensor heating as a result of the measurement current is then carried out implicitly.

The sensor heating can be controlled in a targeted manner by means of the parameters mentioned (current intensity of the measurement current, current intensity of the increased measurement current, length of the limited interval of time and repetition rate of step b)). In order to reduce the sensor heating, the current intensity, length of the limited interval of time and/or the repetition rate is/are reduced, in particular. In order to boost the sensor heating, the current intensity, the length of the limited interval of time and/or the repetition rate is/are increased, in particular.

For the regulation in step e), the temperature currently determined or measured using the temperature sensor arrangement is also determined, in particular. Self-heating of the temperature sensor circuit by the measurement current can be prevented with the regulation in step e).

The intention here is also to describe a computer program which is configured to carry out the described method (in particular using the described temperature sensor circuit). The computer program is configured, in particular, to be executed on a control device, to which the temperature sensor circuit is connected.

In addition, the intention here is to describe a data storage medium having such a computer program. The computer program is stored and provided on the data storage medium.

BRIEF DESCRIPTION OF THE DRAWINGS

The described temperature sensor circuit is explained in more detail below on the basis of the figures. It should be pointed out that the figures are only schematic and show special embodiment variants of the invention.

DETAILED DESCRIPTION

Figure 1:
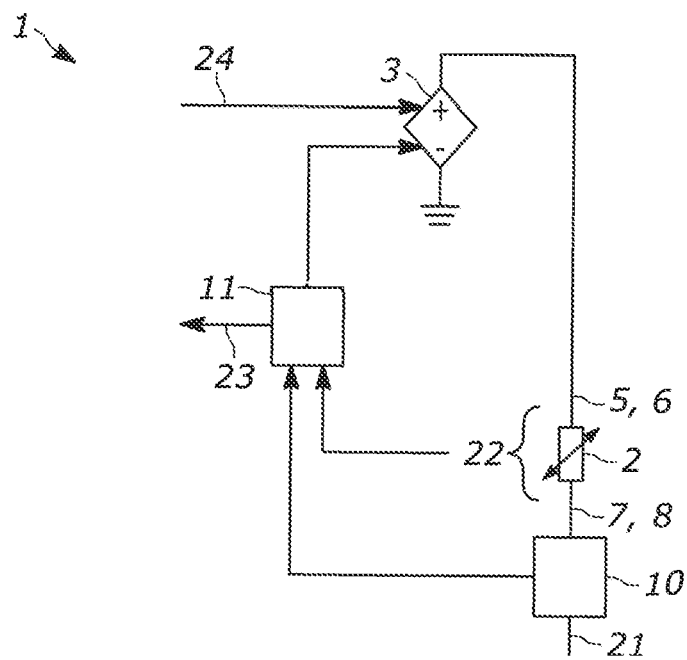
FIG. 1: a basic schematic diagram of a described temperature sensor circuit.
Figure 2:
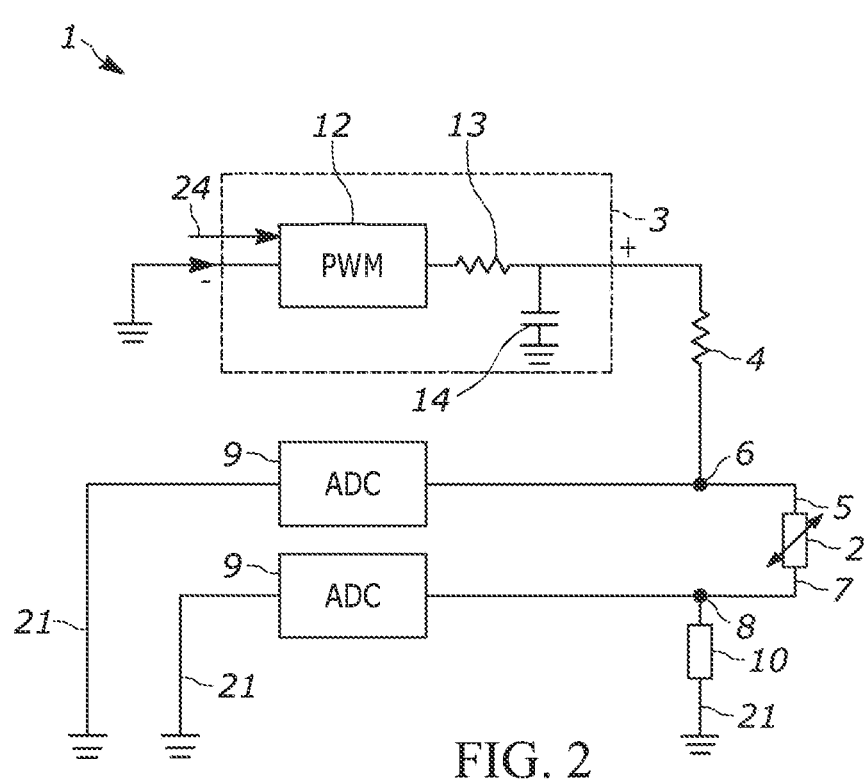
FIG. 2: an exemplary implementation of a described temperature sensor circuit.

FIG. 1 and FIG. 2 together show the principle of the described temperature sensor circuit 1, in which case FIG. 1 shows a basic schematic diagram and FIG. 2 illustrates the electronic components of the temperature sensor circuit 1.

It can be seen in FIG. 1 that the measurement resistor 2 of the temperature sensor circuit 1 is connected between a controllable voltage source 3 and a reference potential 21. When a measurement current flows, a voltage drop 22 is established across the measurement resistor 2, which voltage drop can be tapped off between a first connection 6 at a first end 5 of the measurement resistor 2 and a second connection 8 at a second end 7 of the measurement resistor 2 and is transferred to an evaluation circuit 11 which uses it to generate an output signal 23 which represents the temperature determined by the temperature sensor circuit 1. The controllable voltage source 3 can preferably be regulated by the evaluation circuit 11. The controllable voltage source 3 is preferably regulated by the evaluation circuit 11 in such a manner that the temperature sensor circuit 1 is not heated, or is heated only to an extent which does not negatively affect the temperature measurement, on account of the measurement current. The controllable voltage source 3 is configured to generate a reduced voltage for the temperature measurement from a vehicle electrical system voltage 24 which has been provided. In order to determine the applied measurement current, a current sensor 10 is also connected in series with the measurement resistor 2 and emits a current signal to the evaluation circuit 11.

FIG. 2 illustrates some electrical components of the temperature sensor circuit 1 in detail, which thus cannot be gathered from FIG. 1. For example, the controllable voltage source 3 which comprises a controllable PWM module 12 and a smoothing circuit consisting of a damping resistor 13 and a capacitor 14 is illustrated in more detail. This smoothing circuit generates a uniform voltage signal with reduced voltage from a square-wave voltage signal at an output of the PWM module 12. A voltage divider resistor 4 which is connected in series with the measurement resistor 2 can also be seen in FIG. 2. Analog/digital converters 9 which are connected to the first connection 6 and to the second connection 8 and are used to digitize analog voltage signals at the first connection 6 and at the second connection 8 for further evaluation can also be seen in FIG. 2. The current sensor 10 is also additionally illustrated in FIG. 2. The current sensor 10 can be implemented, for example, with a fixed resistor which is at the same reference mass 21 as the analog/digital converter(s) 9. This fixed resistor 4 can be used to determine the current through the measurement resistor 2. A separate current sensor 10 is then not required.

Figure 3:
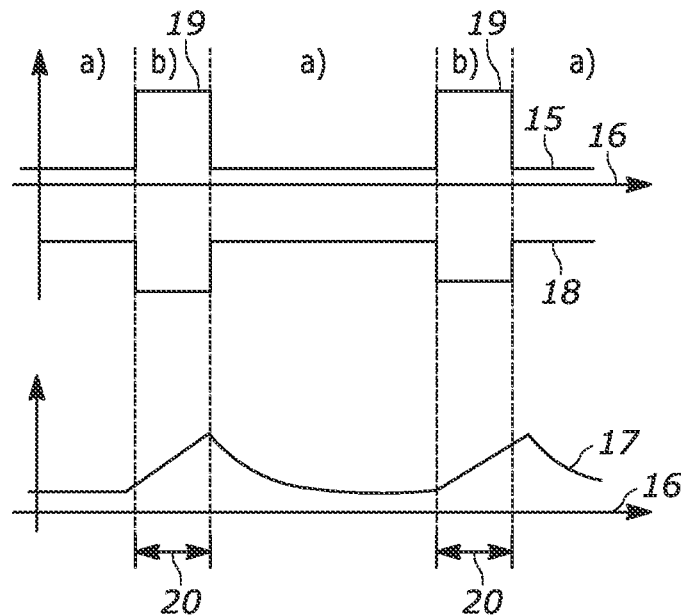
FIG. 3: a temporal flow diagram of a temperature measurement using a described temperature sensor circuit.

FIG. 3 shows a temporal flow diagram of a temperature measurement. Phases with an increased measurement current 19 (step b)) and phases with a measurement current 15 which is not increased (step a)) can be seen across a time axis. The measurement error 18 of the temperature measurement, which is likewise schematically plotted in the diagram, is lower in the phases according to step b) than in the phases according to step a). However, increased sensor heating 17 occurs in the phases according to step b). The sensor heating 17 is intended to be reduced overall. Therefore, the measurement according to step b) is not carried out permanently.

Figure 4:
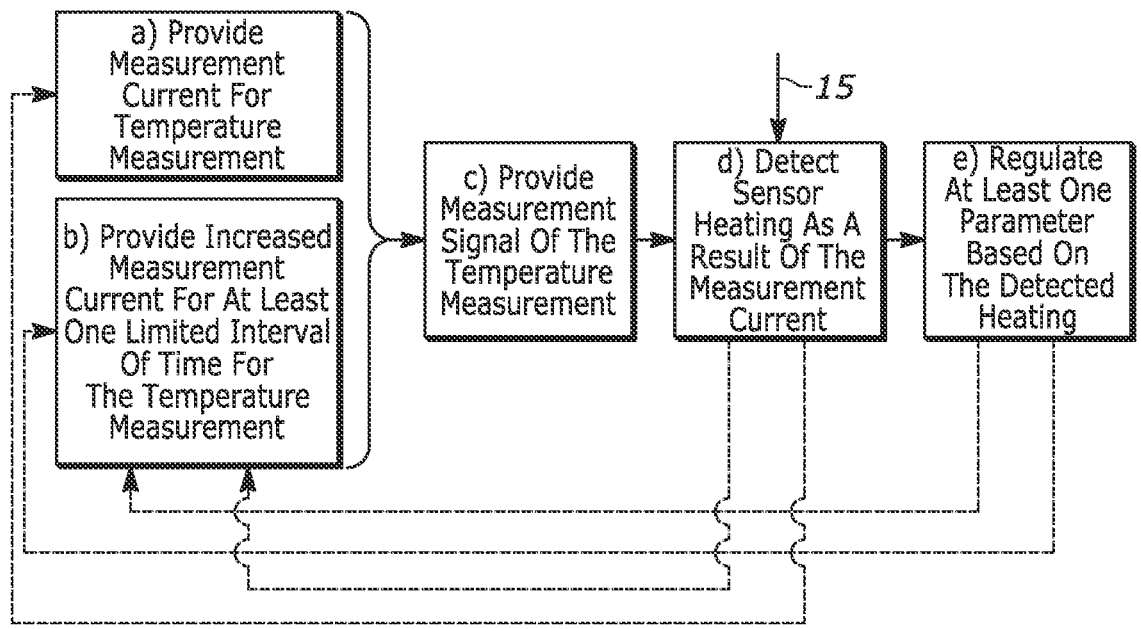
FIG. 4: a flow diagram of the method steps of the described method.

FIG. 4 illustrates the method steps of a temperature measurement a) to e). It is schematically indicated that method steps a) and b) take place with a temporal offset or possibly even parallel to one another. A measurement signal is provided (step c)) both during step a) and during step b), but this measurement signal has a higher degree of accuracy during step b) than during step a). Sensor heating is estimated in step d) on the basis of the measurement signal and a measurement current 15 which occurs. The method (in particular the performance of method steps a) and b)) is controlled with step e) on the basis of the estimated sensor heating.

The invention claimed is:

1. A temperature sensor circuit (1) for measuring a temperature, the temperature sensor circuit comprising:
   a measurement resistor (2) and a controllable voltage source (3) or current source (3) which is connected to the measurement resistor (2) and configured to apply an input voltage to the measurement resistor (2), wherein the input voltage can be adjusted continuously using the controllable voltage source (3) or current source (3);
   wherein a first connection (6) for reducing a first measurement voltage signal is at a first end (5) of the measurement resistor (2);
   wherein a second connection (8) for reducing a second measurement voltage signal is at a second end (7) of the measurement resistor (2);
   wherein an analog/digital converter (9) is connected the first connection and the second connection for reducing a differential measurement voltage based on the first and second measurement voltage signals; and
   wherein the analog/digital converter (9) converts the differential measurement voltage into a digital voltage signal.

2. The temperature sensor circuit (1) as claimed in claim 1, further comprising a voltage divider resistor (4), with which the measurement resistor (2) is connected in series.

3. The temperature sensor circuit (1) as claimed in claim 1, wherein a current sensor (10) is connected in series with the measurement resistor (2) in order to measure an electrical current flowing through the measurement resistor (2).

4. The temperature sensor circuit (1) as claimed in claim 1, having an evaluation circuit (11) which is configured to regulate the controllable voltage source (3) on the basis of an input variable from the temperature sensor circuit (1) in order to adapt the input voltage to the input variable.

5. The temperature sensor circuit (1) as claimed in claim 1, wherein the controllable voltage source (3) or current source (3) has a PWM module (12) which is connected to a damping resistor (13) and a capacitor (14) in order to generate the input voltage from a constant supply voltage, wherein the input voltage is regulated by specifying a pulse width for the PWM module (12).

6. A method for carrying out a temperature measurement using a temperature sensor circuit (1) having a measurement resistor (2) and a controllable voltage source (3) or current source (3) which is connected to the measurement resistor (2) and configured to apply an input voltage to the measurement resistor (2), wherein the input voltage is adjusted using the controllable voltage source (3) or current source (3), the method comprising steps of:
   a) providing a measurement current (15) which flows through the measurement resistor (2) for the temperature measurement,
   b) providing an increased measurement current (19) which flows through the measurement resistor (2) for the temperature measurement in at least one limited interval of time (20), and
   c) providing a measurement signal of the temperature measurement, wherein an accuracy of the temperature measurement is increased during the limited interval of time (20) from step b);
   d) detecting sensor heating (17) as a result of the measurement current (15), and
   e) decreasing the length of the limited interval of time to reduce the sensor heating (17) on the basis of the heating detected in step d).

7. The method as claimed in claim 6, further comprising steps of:
   e) regulating at least one of the following parameters on the basis of the heating detected in step d):
      intensity of the increased measurement current (19) in step b),
      intensity of the measurement current (15) in step a), and
      repetition rate of step b).

8. A non-transitory, computer-readable media containing program instructions that when executed by a computer cause the computer to control a temperature sensor circuit having (1) a measurement resistor (2) and a controllable voltage source (3) or current source (3) which is connected to the measurement resistor (2) and configured to apply an input voltage to the measurement resistor (2), wherein the input voltage is adjusted using the controllable voltage source (3) or current source (3), to:

a) provide a measurement current (15) which flows through the measurement resistor (2) for the temperature measurement,
b) provide an increased measurement current (19) which flows through the measurement resistor (2) for the temperature measurement in at least one limited interval of time (20), and
c) provide a measurement signal of the temperature measurement, wherein an accuracy of the temperature measurement is increased during the limited interval of time (20) from step b);
d) detect sensor heating (17) as a result of the measurement current (15), and
e) decrease the length of the limited interval of time to reduce the sensor heating (17) on the basis of the heating detected in step d).

\* \* \* \* \*